(12) United States Patent
Söllner et al.

(10) Patent No.: US 7,835,225 B2
(45) Date of Patent: Nov. 16, 2010

(54) METHOD FOR ATTENUATING PARTICLE MOTION SENSOR NOISE IN DUAL SENSOR TOWED MARINE SEISMIC STREAMERS

(75) Inventors: Walter Söllner, Oslo (NO); Xiao-Ping Li, Gjettum (NO); Martin Widmaier, Oslo (NO)

(73) Assignee: PGS Geophysical AS, Lysaker (NO)

( * ) Notice: Subject to any disclaimer, the term of this patent is extended or adjusted under 35 U.S.C. 154(b) by 306 days.

(21) Appl. No.: 11/546,448

(22) Filed: Oct. 11, 2006

(65) Prior Publication Data

US 2008/0089174 A1    Apr. 17, 2008

(51) Int. Cl.
*G01V 1/38* (2006.01)
(52) U.S. Cl. .......................................... 367/24
(58) Field of Classification Search ................... 367/24, 367/21; 702/17
See application file for complete search history.

(56) References Cited

U.S. PATENT DOCUMENTS

| | | | | |
|---|---|---|---|---|
| 3,344,396 | A * | 9/1967 | Bennett | 367/43 |
| 4,611,312 | A * | 9/1986 | Ikeda | 367/38 |
| 4,752,916 | A * | 6/1988 | Loewenthal | 367/24 |
| 5,235,554 | A * | 8/1993 | Barr et al. | 367/13 |
| 6,430,508 | B1 * | 8/2002 | Sudhakar et al. | 702/6 |
| 6,678,207 | B2 * | 1/2004 | Duren | 367/24 |
| 6,894,948 | B2 * | 5/2005 | Brittan et al. | 367/24 |
| 7,336,561 | B2 * | 2/2008 | Borresen | 367/24 |
| 7,386,397 | B2 * | 6/2008 | Amundsen et al. | 702/14 |
| 2005/0195686 | A1 | 9/2005 | Vaage et al. | |
| 2006/0050611 | A1 | 3/2006 | Børresen | |
| 2006/0133202 | A1 | 6/2006 | Tenghamn | |

FOREIGN PATENT DOCUMENTS

GB    2 411 722    9/2005

(Continued)

OTHER PUBLICATIONS

L. Amundsen, A. Reitan, "Decomposition of multicomponent sea-floor data into upgoing and downgoing P- and S-waves", (Mar.-Apr. 1995) Geophysics, pp. 563-572, vol. 60, No. 2.

(Continued)

*Primary Examiner*—Jack Keith
*Assistant Examiner*—Krystine Breier
(74) *Attorney, Agent, or Firm*—E. Eugene Thigpen; Charles R. Schweppe

(57) ABSTRACT

Signals detected by particle motion sensors in a towed dual sensor marine seismic streamer are scaled to match signals detected by pressure sensors in the streamer. The pressure sensor signals and the scaled particle motion sensor signals are combined to generate up-going and down-going pressure wavefield components. The up-going and down-going pressure wavefield components are extrapolated to a position just below a water surface. A first matching filter is applied to the extrapolated down-going pressure wavefield component. The filtered down-going pressure wavefield component is subtracted from the extrapolated up-going pressure wavefield component, generating an up-going pressure wavefield component with attenuated particle motion sensor noise. A second matching filter is applied to the extrapolated up-going pressure wavefield component. The filtered up-going pressure wavefield component is subtracted from the extrapolated down-going pressure wavefield component, generating a down-going pressure wavefield component with attenuated particle motion sensor noise.

18 Claims, 4 Drawing Sheets

FOREIGN PATENT DOCUMENTS

GB        2 430 748      4/2007

OTHER PUBLICATIONS

J.T. Fokkema, P.M. Van Den Berg, "Seismic application of acoustic reciprocity", (1993) published by Elsevier, Chapters 10 "Wavefield Decomposition" and Chapter 11 "Deghosting", pp. 200-231.

Arthur B. Weglein, Bruce G. Secrest, (Jul. 1990), "Wavelet estimation for a multidimensional acoustic or elastic earth", pp. 902-913, vol. 55, No. 7.

Stephen Jennings, British Search Report, Feb. 8, 2008.

\* cited by examiner

METHOD FOR ATTENUATING PARTICLE MOTION SENSOR NOISE IN DUAL SENSOR TOWED MARINE SEISMIC STREAMERS

CROSS-REFERENCES TO RELATED APPLICATIONS

Not Applicable

FEDERALLY SPONSORED RESEARCH OR DEVELOPMENT

Not Applicable

SEQUENCE LISTING, TABLE, OR COMPUTER LISTING

Not Applicable

BACKGROUND OF THE INVENTION

1. Field of the Invention

This invention relates generally to the field of geophysical prospecting and particularly to the field of marine seismic data processing. More particularly, the invention relates to noise attenuation in dual sensor towed marine seismic streamers.

2. Description of the Related Art

In the oil and gas industry, geophysical prospecting is commonly used to aid in the search for and evaluation of subterranean formations. Geophysical prospecting techniques yield knowledge of the subsurface structure of the earth, which is useful for finding and extracting valuable mineral resources, particularly hydrocarbon deposits such as oil and natural gas. A well-known technique of geophysical prospecting is a seismic survey. In a land-based seismic survey, a seismic signal is generated on or near the earth's surface and then travels downwardly into the subsurface of the earth. In a marine seismic survey, the seismic signal will first travel downwardly through a body of water overlying the subsurface of the earth.

Seismic energy sources are used to generate the seismic signal which, after propagating into the earth, is at least partially reflected by subsurface seismic reflectors. Such seismic reflectors typically are interfaces between subterranean formations having different elastic properties, specifically wave velocity and rock density, which lead to differences in acoustic impedance at the interfaces. The reflections are detected by seismic sensors at or near the surface of the earth, in an overlying body of water, or at known depths in boreholes. The resulting seismic data is recorded and processed to yield information relating to the geologic structure and properties of the subterranean formations and their potential hydrocarbon content.

Appropriate energy sources for seismic surveys may include explosives or vibrators on land and air guns or marine vibrators in water. Appropriate types of seismic sensors may include particle motion sensors in land surveys and water pressure sensors in marine surveys. Particle motion sensors are typically particle velocity sensors, but particle displacement, particle acceleration sensors, or pressure gradient sensors may be used instead of particle velocity sensors. Particle velocity sensors are commonly known in the art as geophones and water pressure sensors are commonly known in the art as hydrophones. Both seismic sources and seismic sensors may be deployed by themselves or, more commonly, in arrays.

In a typical marine seismic survey, a seismic survey vessel travels on the water surface, typically at about 5 knots, and contains seismic acquisition equipment, such as navigation control, seismic source control, seismic sensor control, and recording equipment. The seismic source control equipment causes a seismic source towed in the body of water by the seismic vessel to actuate at selected times. Seismic streamers, also called seismic cables, are elongate cable-like structures towed in the body of water by the seismic survey vessel that tows the seismic source or by another seismic survey ship. Typically, a plurality of seismic streamers are towed behind a seismic vessel. The seismic streamers contain sensors to detect the reflected wavefields initiated by the seismic source and reflected from reflecting interfaces. Conventionally, the seismic streamers contain pressure sensors such as hydrophones, but seismic streamers have been proposed that contain water particle velocity sensors such as geophones or particle acceleration sensors such as accelerometers, in addition to hydrophones. The pressure sensors and particle motion sensors may be deployed in close proximity, collocated in pairs or pairs of arrays along a seismic cable.

U.S. patent application Ser. No. 11/021,919, entitled "Motion Sensors in a Towed Streamer", filed on Dec. 22, 2004, and assigned to an affiliated company of the assignee of the present invention describes an example of particle motion sensors appropriate to place in a marine seismic streamer in combination with pressure sensors.

The sources and streamers are submerged in the water, with the seismic sources typically at a depth of 5-15 meters below the water surface and the seismic streamers typically at a depth of 5-40 meters. Seismic data gathering operations are becoming progressively more complex, as more sources and streamers are being employed. These source and streamer systems are typically positioned astern of and to the side of the line of travel of the seismic vessel. Position control devices such as depth controllers, paravanes, and tail buoys are used to regulate and monitor the movement of the seismic streamers.

Alternatively, the seismic cables are maintained at a substantially stationary position in a body of water, either floating at a selected depth or lying on the bottom of the body of water. In this alternative case, the source may be towed behind a vessel to generate acoustic energy at varying locations, or the source may also be maintained in a stationary position.

Recorded seismic data contains signal in terms of the useful primary reflections as well as much noise. The recorded noise may be coherent (that is, acts like a traveling wave) or random. Examples of coherent noise include ground roll, guided waves, side-scattered noise, cable noise, air wave, power lines, and multiples. Multiples are especially strong relative to primaries in marine seismic surveys, because the water-earth and, particularly, the air-water interfaces are strong seismic reflectors due to their high acoustic impedance contrasts. Examples of random noise include poorly planted geophones, wind motion, transient movements in the vicinity of the cable, wave motion in the water causing the cable to vibrate, and electrical noise from the recording instruments. Seismic surveying employing towed marine seismic streamers has a large number of noise sources to deal with.

Marine seismic streamers are typically divided into streamer sections approximately 100 meters in length, and can extend to a length of thousands of meters. A typical streamer section includes an external jacket, strength members, spacers, an electrical wire bundle, and connectors. The external jacket protects the interior of the streamer section from water ingress. The strength members, usually two or more, run down the length of each streamer section from end connector to connector, providing axial mechanical strength. The spacers maintain the cylindrical shape of the streamer section. The electrical wire bundle also runs down the length of each streamer section, and includes electrical power conductors and electrical data communication wires. In some instances, fiber optic connections for data communication are included in the wire bundle. Connectors at the ends of each streamer section link the section mechanically, electrically or optically to adjacent sections and, hence, ultimately to the seismic towing vessel.

The external jacket and strength members are typically designed to be straight and uniformly thick throughout the length of the streamer section while they are not subject to external stress. The electrical wire bundle, on the other hand, is typically designed to be capable of deforming, so that it can bend readily as the streamer cable itself bends while turning in the water, or is being deployed from or retrieved onto the streamer winch for storage on the survey vessel.

Sensors, typically hydrophones or arrays of hydrophones, along with geophones or arrays of geophones, are located within the streamer. The hydrophones record the pressure wavefield and the geophones record the particle velocity wavefield. The sensors have sometimes been located within the spacers for protection. The distance between spacers is normally about 0.7 meters. An array of sensors, typically comprising 8 or 16 hydrophones and collocated geophones, normally extends for a length of about 6.25 meters or 12.5 meters, respectively. These two lengths allow 16 or 8 arrays, respectively, in a standard 100 meter seismic section.

The interior of the seismic streamers is typically filled with a core material to provide buoyancy and desirable acoustic properties. For many years, most seismic streamers have been filled with a fluid core material. A drawback to using fluid-filled streamer sections is the noise generated by vibrations as the streamer is towed through the water. These vibrations develop internal pressure waves traveling through the fluid in the streamer sections, which are often referred to as "bulge waves" or "breathing waves".

Several approaches have been employed to reduce the bulge wave noise problem in fluid-filled steamer sections. For example, one approach is the use of stretch sections at the front and rear of the seismic streamer. Another approach is the application of low-cut frequency filters. Another approach is to introduce compartment blocks in the sections to impede the vibration-caused bulge waves from traveling continuously along the streamer. Another approach is to introduce open cell foam into the interior cavity of the streamer section. The open cell foam restricts the flow of the fluid fill material in response to the transient pressure change and causes the energy to be dissipated into the external jacket and the foam over a shorter distance. Yet another approach is to eliminate the fluid from the streamer sections, so that no medium exists in which bulge waves can develop. This approach is exemplified by the use of streamer sections filled with a solid core material or softer solid material instead of a fluid. However, in any solid type of material, some shear waves will develop, which can increase the noise detected by both the hydrophones and the geophones. Shear waves cannot develop in a fluid fill material since fluids have no shear modulus. Additionally, many conventional solid core materials are not acoustically transparent to the desired pressure waves.

Mechanical energy may travel in a "fast" mode, typically as a longitudinal wave along the strength members, at about 1100-1300 meters/second or in a "slow" mode, typically as a transverse wave, at about 20-60 meters/second. This fast mode is the dominant mechanical noise encountered with hydrophones, while the slow mode is the dominant mechanical noise encountered with geophones.

Another approach to address the noise problem is to combine several hydrophones into an array (also known as a group) to attenuate a slow moving wave. Typically, an equal number of hydrophones are positioned between or on both sides of the spacers so that pairs of hydrophones sense equal and opposite pressure changes. Summing the hydrophone signals from an array can then cancel out some of the noise.

Many of the conventional methods apply seismic processing to pressure sensors only. However, the pressure sensor data has spectral notches caused by the water surface reflections, commonly referred to as sea surface ghosts. These spectral notches are often in the seismic acquisition frequency band. Thus, the usable portion of the pressure sensor data is frequency band limited away from the spectral notches and cannot cover the entire seismic acquisition frequency band. This limitation can be avoided by using both pressure sensors and particle motion sensors in a "dual-sensor" streamer.

L. Amundsen and A. Reitan, in their article "Decomposition of multicomponent sea-floor data into upgoing and downgoing P- and S-waves", *Geophysics*, Vol. 60, No. 2, March-April, 1995, p. 563-572, describe a method for deghosting dual sensor cable data in the water layer and on the sea floor. Amundsen and Reitan construct a decomposition filter to apply to pressure recorded by hydrophones just above the sea floor and the radial and vertical components of the particle velocity recorded by geophones just below the sea floor. The decomposition filter separates the data into upgoing and downgoing P- and S-waves, yielding the deghosted wavefield in the up-going components. The decomposition filter coefficients depend upon the P- and S-wave velocities and the density at the sea floor.

U.S. patent application Ser. No. 10/935,515, entitled "System for Attenuation of Water Bottom Multiples in Seismic Data Recorded by Pressure Sensors and Particle Motion Sensors", filed on Sep. 7, 2004, and assigned to an affiliated company of the assignee of the present invention describes a method for attenuation of water bottom multiples in marine seismic data. The method includes calculating up-going and down-going wavefield components from pressure sensor and particle motion sensor signals, extrapolating the wavefields to the water bottom, and utilizing the extrapolated wavefields and a water bottom reflection coefficient to generate an up-going wavefield substantially without water bottom multiples.

Several other methods known in the art provide procedures for processing dual sensor data to reduce the ghost notches in marine seismic data acquired utilizing towed marine streamers, ocean bottom cable, or vertical cable. These processing methods utilize pressure sensor data and vertical particle motion sensor data to construct filters that separate the dual sensor data into up-going and down-going wavefield components. The up-going wavefield component is the deghosted wavefield. As is well known in the art, particle motion sensors are significantly more sensitive to mechanical noise than pressure sensors. Thus, the deghosting approaches of these prior procedures are introducing additional noise into the up-going pressure wavefield component.

Thus, a need exists for a method of deghosting which effectively attenuates the infiltration of particle motion sensor noise from the separated pressure wavefields. In particular, a need exists for a method that can remove the receiver-side ghost and attenuate the mechanical particle motion sensor noise in a towed streamer.

BRIEF SUMMARY OF THE INVENTION

The invention is a method for processing seismic data from a towed marine seismic streamer having particle motion sensors and pressure sensors. In one embodiment, signals detected by the particle motion sensors are scaled to match signals detected by the pressure sensors. The pressure sensor signals and the scaled particle motion sensor signals are combined to generate up-going and down-going pressure wavefield components. The up-going and down-going pressure wavefield components are extrapolated to a position just below a water surface. A first matching filter is applied to the extrapolated down-going pressure wavefield component. The filtered down-going pressure wavefield component is subtracted from the extrapolated up-going pressure wavefield component, generating an up-going pressure wavefield component with attenuated particle velocity sensor noise.

In another embodiment, a second matching filter is applied to the extrapolated up-going pressure wavefield component. The filtered up-going pressure wavefield component is subtracted from the extrapolated down-going pressure wavefield component, generating a down-going pressure wavefield component with attenuated particle velocity sensor noise.

In another embodiment, the extrapolated up-going and down-going pressure wavefield components are first backward extrapolated to a virtual observation surface and the down-going pressure wavefield component is matched to the extrapolated up-going pressure wavefield component before subtracting.

In another embodiment, the extrapolated up-going and down-going pressure wavefield components are first forward extrapolated to a virtual observation surface and the up-going pressure wavefield component is matched to the extrapolated down-going pressure wavefield component before subtracting.

BRIEF DESCRIPTION OF THE DRAWINGS

The invention and its advantages may be more easily understood by reference to the following detailed description and the attached drawings, in which.

Figure 1:
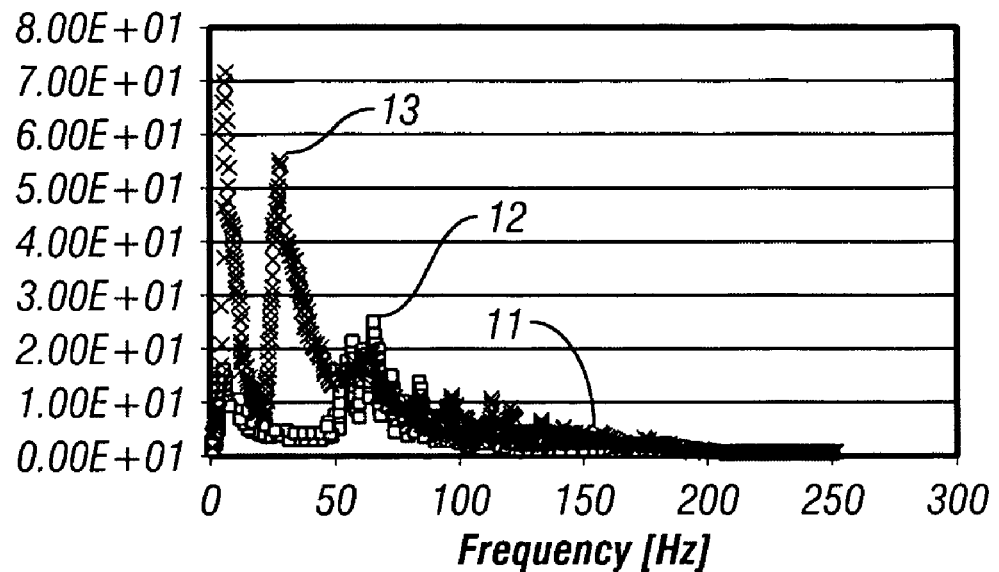
FIG. 1 is an example of an amplitude spectra of geophone noise and hydrophone noise.

While the invention will be described in connection with its preferred embodiments, it will be understood that the invention is not limited to these. On the contrary, the invention is intended to cover all alternatives, modifications, and equivalents that may be included within the scope of the invention, as defined by the appended claims.

DETAILED DESCRIPTION OF THE INVENTION

The invention is a method for processing dual sensor seismic data acquired by towed streamers during a marine seismic survey. In particular, the invention is a method for attenuating mechanical noise from a particle motion sensor signal in the dual sensor data. Particle motion sensors are typically particle velocity sensors, but other particle motion sensors, including particle acceleration sensors, may be used instead of particle velocity sensors in dual sensor streamers. Particle velocity sensors are commonly known in the art as geophones and particle acceleration sensors are commonly known in the art as accelerometers. The present invention will be described with embodiments employing geophones, but this sensor choice is for simplicity of illustration only and is not intended to be a restriction of the invention.

The method of the invention utilizes dual sensor seismic data, comprising the pressure wavefield as acquired by pressure sensors such as hydrophones and the vertical velocity wavefield of the particle motion as acquired simultaneously by collocated particle motion sensors such as geophones, in response to a marine seismic source. The signals detected by the particle motion sensors are scaled by an amplitude scaling function to match the signals detected by the pressure sensors. Then, the pressure sensor signal and the scaled particle motion sensor signals are combined to separate the total pressure wavefield into up-going and down-going pressure wavefield components. The separated up-going and down-going pressure wavefield components are then extrapolated from the streamer sensor position up to a position just below the water surface.

Adaptive matching filters are applied to the extrapolated up-going and downgoing pressure wavefield components to compensate for inconsistencies between the recorded wavefields. The filtered down-going pressure wavefield component is subtracted from the extrapolated up-going pressure wavefield component to generate an up-going-pressure wavefield component at the position just below the water surface with the infiltrated geophone noise spectra attenuated by a cosine filter. This calculated up-going pressure wavefield component is also the deghosted pressure wavefield. Similarly, the filtered up-going pressure wavefield component is subtracted from the extrapolated down-going pressure wavefield component to generate a down-going pressure wavefield component at the position just below the water surface with the geophone noise also attenuated by the cosine filter.

The pressure wavefield components extrapolated to just below the water surface may also be first further extrapolated to an arbitrary virtual observation surface before applying the above filter and subtraction steps. Then the resulting up-going and down-going pressure wavefield components at the virtual observation surface still have their geophone noise substantially attenuated by the same cosine filter. The notches of this cosine filter determine the peaks of maximal geophone noise suppression, and are dependent upon the extrapolation distance, which is determined solely by the towing depth of the seismic streamer. The details of illustrative embodiments of the method of the invention are further described below.

Wavefields, such as the pressure wavefield P and the vertical velocity wavefield $V_z$, comprise an up-going wavefield component and a down-going wavefield component. For example, the pressure wavefield P comprises an up-going wavefield component $P_u$ and a down-going wavefield component $P_d$:

$$P = P_u + P_d. \qquad (1)$$

The subscripts u and d designate up-going and down-going travel directions, respectively, of wavefields at any location.

A particle motion sensor such as a geophone has directional sensitivity (with positive deflection in the vertical +z direction, by convention) whereas a pressure sensor such as a hydrophone does not. A pressure sensor is omni-directional. The water/air interface at a water surface is an excellent reflector of seismic waves and so the reflection coefficient at the water surface is nearly unity in magnitude and negative in sign for pressure signals. Thus, the downwardly propagating wavefields reflected from the water surface will be phase-shifted 180° relative to the upwardly propagating wavefields. Accordingly, the up-going wavefield signal components detected by a geophone and a hydrophone located close together will be recorded 180° out of phase, while the down-going wavefield signal components will be recorded in phase. In an alternative sign convention, not used in this illustration of the invention, the up-going wavefield signal components would be recorded in phase, while the down-going wavefield signal components would be recorded 180° out of phase.

While a hydrophone records the total wavefield omni-directionally, a vertical geophone, as typically utilized in seismic processing, only records the vertical component of the wavefield uni-directionally. The vertical component of the wavefield will only be equal to the total wavefield for signals that happen to be propagating vertically downward. If $\theta$ is the angle of incidence between the signal wave front and the sensor orientation, then vertical upward propagation is conventionally defined by incidence angle $\theta=0$.

Thus, in the method of the invention, the recorded signal $V_z$ of a vertical geophone, a plane wave with incidence angle $\theta$, needs to be adjusted to the recorded signal of a geophone detecting the total wavefield and then, to further be adjusted to match the recorded pressure wavefield P of a hydrophone. This adjustment is made in the method of the invention by scaling the vertical geophone signal $V_z$ by an appropriate amplitude scaling function, such as:

$$\frac{\rho c}{\cos(\theta)}. \quad (2)$$

Here, the factor $\rho c$ is the acoustic impedance of water, where $\rho$ is the density of water and c is the acoustic velocity of water. In the space-time domain, the angle-dependent amplitude scaling function is a multi-channel filter that transforms the unidirectional vertical velocity wavefield of the geophone recording $V_z$ into an omni-directional pressure wavefield P. Thus, in the following description of the method of the invention, all wavefields considered will either be recorded as pressure wavefields or scaled by this amplitude scaling function to act as pressure wavefields.

In the frequency-wavenumber domain, the amplitude scaling function $\tilde{w}$ can be expressed as:

$$\tilde{w} = \frac{\rho \omega}{k_z}, \quad (3)$$

where $$k_z = \sqrt{\frac{\omega^2}{c^2} - k_x^2 - k_y^2} \quad (4)$$

is the vertical wavenumber, $\omega = 2\pi f$ is the angular frequency for frequency f, and $k_x$ and $k_y$ are the horizontal wavenumbers in two orthogonal horizontal directions. Typically, the two horizontal directions would be chosen in the in-line and cross-line directions of the marine seismic survey. Alphabetic characters marked with a tilde will here designate wavefields such as $\tilde{V}_z$ or functions such as w transformed into the frequency-wavenumber domain. For positive real values of $k_z$, Equation (3) gives the amplitude scaling function $\tilde{w}$ for the vertical velocity wavefield $\tilde{V}_z$ in the frequency-wavenumber domain.

Alternatively, in the plane-wave domain, the amplitude scaling function $\tilde{w}$ can also be expressed as:

$$\tilde{\tilde{w}} = \frac{\rho}{p_z}, \quad (5)$$

where $$p_z = \sqrt{\frac{1}{c^2} - p_x^2 - p_y^2} \quad (6)$$

is the vertical slowness and $p_x$ and $p_y$ are the horizontal slownesses in two orthogonal horizontal directions. Alphabetic characters marked with a double tilde will here designate wavefields such as $\tilde{\tilde{V}}_z$ or functions such as w transformed into the plane-wave domain. For positive real values of $p_z$, Equation (5) gives the amplitude scaling function $\tilde{\tilde{w}}$ for the vertical velocity wavefield $\tilde{\tilde{V}}_z$ in the plane-wave domain.

In other alternative embodiments, the amplitude scaling function can be obtained as a spatial filter w in the space-time domain by applying an inverse Fourier transform to the frequency-wavenumber domain representation of the amplitude scaling function $\tilde{w}$ from Equation (3) or by applying an inverse Radon transform to the plane-wave representation of the amplitude scaling function $\tilde{\tilde{w}}$ from Equation (5). In the following, the method of the invention will be illustrated by representation in the frequency-wavenumber domain. This choice of domain is not intended to be a limitation of the invention, but merely for simplicity of illustration.

The total pressure wavefield $\tilde{P}$, such as recorded by a hydrophone at the streamer sensor position, is the sum of an up-going pressure wavefield component $\tilde{P}_u$ and a down-going pressure wavefield component $\tilde{P}_d$ at the sensor position, as represented in the frequency-wavenumber domain by:

$$\tilde{P} = \tilde{P}_u + \tilde{P}_d. \quad (7)$$

The vertical velocity wavefield $\tilde{V}_z$, such as recorded by a geophone at the streamer sensor position, and after scaling by the amplitude scaling factor $-\tilde{w}$ to act as a pressure wavefield, is the difference of the up-going pressure wavefield component $\tilde{P}_u$ and the down-going pressure wavefield component $\tilde{P}_d$ at the sensor position, as represented in the frequency-wavenumber domain by:

$$-\tilde{w}\tilde{V}_z = \tilde{P}_u - \tilde{P}_d \quad (8)$$

Combining Equations (7) and (8) yields a method for calculating the up-going pressure wavefield component $\tilde{P}_u$ and the down-going pressure wavefield component $\tilde{P}_d$ at the sensor position:

$$\tilde{P}_u = \frac{\tilde{P} - \tilde{w}\tilde{V}_z}{2} \quad (9)$$

and

-continued $$\tilde{P}_d = \frac{\tilde{P} + \tilde{w}\tilde{V}_z}{2}. \quad (10)$$

Thus, the up-going and down-going pressure wavefield components may be obtained in the frequency-wavenumber domain by subtracting and adding, respectively, the scaled vertical particle velocity wavefield $\tilde{w}\tilde{V}_z$ from and to, respectively, the pressure wavefield $\tilde{P}$.

The real data as recorded by a hydrophone $\tilde{H}$ contains a signal component $\tilde{P}$ and an additive noise component $\tilde{N}_H$, represented in the frequency-wavenumber domain by:

$$\tilde{H} = \tilde{P} + \tilde{N}_H. \quad (11)$$

Similarly, the real data as recorded by a geophone $\tilde{G}$ contains a signal component $\tilde{V}_z$ and an additive noise component $\tilde{N}_G$, represented in the frequency-wavenumber domain by:

$$\tilde{G} = \tilde{V}_z + \tilde{N}_G. \quad (12)$$

Typically, the vertical velocity wavefield $\tilde{G}$ acquired by geophones in a towed streamer is dominated by mechanical noise, while the pressure wavefield $\tilde{H}$ acquired simultaneously at the same position by hydrophones is acceptably clean. Thus, the hydrophone noise is approximately zero, that is, $\tilde{N}_H \approx 0$ in Equation (11), and can be ignored in comparison to the geophone noise. Equation (11) then reduces to:

$$\tilde{H} = \tilde{P} \quad (13)$$

Unfortunately, the geophone noise is typically much greater than zero, that is, $\tilde{N}_G >> 0$ in Equation (12), and cannot be ignored.

FIG. 1 shows an example of the amplitude spectra of geophone noise $\tilde{N}_G$ 11 and hydrophone noise $\tilde{N}_H$ 12, calculated from a one second time window summed over 150 traces. (This analysis window is the same for the following FIGS. 2-5.) The peak 13 of the geophone noise $\tilde{N}_G$ 11 is at approximately 20-30 Hz (Hertz). The geophone noise $\tilde{N}_G$ 11 is much greater than the hydrophone noise $\tilde{N}_H$ 12 at the lower frequencies, that is, in the range of frequencies less than 50 Hz, in this example. The high peak 13 of geophone noise, $\tilde{N}_G$ 11, between 20 Hz and 50 Hz, is additive, nonrandom mechanical noise, well localized in the frequency domain, and not correlated with the weak additive hydrophone noise $\tilde{N}_H$. The method of the invention attenuates this peak 13 of the geophone noise $\tilde{N}_G$ 11 in the process of receiver-side deghosting.

Equations (12)-(13) yield alternative versions of Equations (9)-(10) for calculating the up-going pressure wavefield component $\tilde{P}_u$ and the down-going pressure wavefield component $\tilde{P}_d$ at the sensor position, accompanied by the scaled geophone noise $\tilde{w}\tilde{N}_G$:

$$\frac{\tilde{H} - \tilde{w}\tilde{G}}{2} = \frac{\tilde{P} - \tilde{w}\tilde{V}_z - \tilde{w}\tilde{N}_G}{2} = \tilde{P}_u - \frac{1}{2}\tilde{w}\tilde{N}_G \quad (14)$$

and $$\frac{\tilde{H} + \tilde{w}\tilde{G}}{2} = \frac{\tilde{P} + \tilde{w}\tilde{V}_z + \tilde{w}\tilde{N}_G}{2} = \tilde{P}_d + \frac{1}{2}\tilde{w}\tilde{N}_G \quad (15)$$

in terms of the recorded hydrophone and scaled geophone data, $\tilde{H}$ and $\tilde{w}\tilde{G}$, respectively.

Extrapolating the up-going pressure wavefield component, as obtained by application of Equation (14), from the streamer sensor position at a depth of $z_r$ to a position just below the water surface can be calculated by the following expression in the frequency-wavenumber domain:

$$\left(\tilde{P}_u - \frac{1}{2}\tilde{w}\tilde{N}_G\right)\exp[-ik_z(z_r - z)]\bigg|_{z \to 0}^{+}, \quad (16)$$

where $k_z$ is the vertical wavenumber and the exponential term $\exp[-ik_z(z,-z)]$ represents the forward extrapolation operator for up-going wavefields. Included with the up-going pressure wavefield component $\tilde{P}_u$ at the streamer sensor position is the up-going component of the geophone noise, $-\frac{1}{2}\tilde{w}\tilde{N}_G$, as seen from Equations (9)-(12). Alternatively, from Equation (14), the expression calculated in (16) is also equivalent to:

$$\left(\frac{\tilde{H} - \tilde{w}\tilde{G}}{2}\right)\exp[-ik_z(z_r - z)]\bigg|_{z \to 0}^{+}. \quad (17)$$

The "position just below the water surface" is more specifically defined as the observation surface where the sum of the up-going pressure wavefield component and the down-going pressure wavefield component is closest to zero.

Similarly, extrapolating the down-going pressure wavefield component, as obtained by application of Equation (15), from the streamer sensor position to the same position just below the water surface can be calculated by the following expression in the frequency-wavenumber domain:

$$\left(\tilde{P}_d + \frac{1}{2}\tilde{w}\tilde{N}_G\right)\exp[ik_z(z_r - z)]\bigg|_{z \to 0}^{+}, \quad (18)$$

where the exponential term $\exp[ik_z(z,-z)]$ represents the backward extrapolation operator for down-going wavefields. Again, included with the down-going pressure wavefield component $\tilde{P}_d$ at the streamer sensor position is the down-going component of the geophone noise, $\frac{1}{2}\tilde{w}\tilde{N}_G$. Again, alternatively from Equation (15), the expression calculated in (18) is also equivalent to:

$$\left(\frac{\tilde{H} - \tilde{w}\tilde{G}}{2}\right)\exp[ik_z(z_r - z)]\bigg|_{z \to 0}^{+}. \quad (19)$$

To simplify the illustration of the method of the invention, the signal of the up-going wavefield component extrapolated to a position just below the water surface will be denoted by:

$$\tilde{p}_u = \tilde{P}_u \exp[-ik_z(z_r - z)]|_{z \to 0}. \quad (20)$$

and the signal of the down-going wavefield signal extrapolated to a position just below the water surface will be denoted by:

$$\tilde{p}_d = \tilde{P}_d \exp[ik_z(z_r - z)]|_{z \to 0}. \quad (21)$$

Taking into account that the reflection coefficient at the water surface is −1, the following general relationship holds between these two extrapolated pressure wavefield components, $\tilde{p}_u$ and $\tilde{p}_d$:

$$\tilde{p}_u = \tilde{p}_d. \quad (22)$$

Subtracting the down-going pressure wavefield component in Equation (18) from the up-going pressure wavefield component in Equation (16) (normalized by a factor of ½), with both wavefields extrapolated to a position just below the water surface, yields the following result, after rearranging the terms:

$$\frac{1}{2}\left(\tilde{P}_u - \frac{1}{2}\tilde{w}\tilde{N}_G\right)\exp[-ik_z(z_r - z)]\bigg|_{z \to 0}^{+} - \quad (23)$$

$$\frac{1}{2}\left(\tilde{P}_d + \frac{1}{2}\tilde{w}\tilde{N}_G\right)\exp[ik_z(z_r - z)]\bigg|_{z \to 0}^{+} =$$

$$\frac{1}{2}(\tilde{p}_u - \tilde{p}_d) - \frac{1}{2}\tilde{w}\tilde{N}_G \frac{\exp(-ik_z z_r) + \exp(ik_z z_r)}{2}.$$

The first term on the right hand side of Equation (23) can be expressed as the up-going pressure wavefield component as the depth decreases to 0 from the positive side, from Equation (22). The second term on the right hand side of Equation (23) can be expressed as the scaled geophone noise filtered by a cosine function dependent upon the vertical wavenumber $k_z$ and the depth $z_r$, due to the exponential definition of the cosine function. Therefore, Equation (23) can be written as:

$$\frac{1}{2}\left(\tilde{P}_u - \frac{1}{2}\tilde{w}\tilde{N}_G\right)\exp[-ik_z(z_r - z)]\bigg|_{z \to 0}^{+} - \quad (24)$$

$$\frac{1}{2}\left(\tilde{P}_d + \frac{1}{2}\tilde{w}\tilde{N}_G\right)\exp[ik_z(z_r - z)]\bigg|_{z \to 0}^{+} = \tilde{p}_u - \frac{1}{2}\tilde{w}\tilde{N}_G \cos(k_z z_r).$$

Thus, the result of subtracting the down-going pressure wavefield component from the up-going pressure wavefield component just below the water surface is the up-going pressure wavefield component $\tilde{p}_u$ just below the water surface along with the scaled geophone noise $\tilde{w}\tilde{N}_G$ attenuated by a cosine filter $\cos(k_z z_r)$. The up-going pressure wavefield component $\tilde{p}_u$ is a deghosted pressure wavefield, since the ghost reflections are contained in the down-going wavefield component $\tilde{p}_d$. Recall that scaling with the amplitude scaling function makes the geophone noise resemble a pressure wavefield. Thus, all the terms in Equations (23) and (24) act as pressure wavefields.

Figure 2:
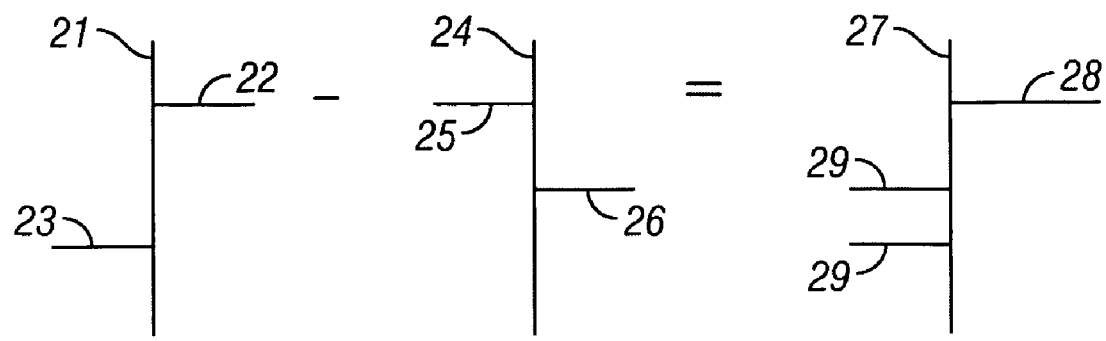
FIG. 2 is a schematic representation of subtraction of the down-going from the up-going pressure wavefield components just below the water surface in the method of the invention.

FIG. 2 shows a schematic representation of this subtraction of the down-going from the up-going pressure wavefield components just below the water surface in the method of the invention. The first trace 21 contains the up-going pressure wavefield component 22 and the geophone noise 23, scaled to resemble a pressure wavefield, with both wavefields extrapolated to just below the water surface. These two parts 22, 23 of the first trace 21 correspond to the two parts, respectively, in the first term on the left-hand side of Equation (24), above. The second trace 24 contains the down-going pressure component 25 and the scaled geophone noise 26, both as extrapolated to just below the water surface. These two parts 25, 26 of the second trace 24 correspond to the two parts, respectively, in the second term on the left-hand side of Equation (24), above. The third trace 27 contains the up-going pressure wavefield component just below the water surface 28 and the scaled geophone noise 29. These two parts 28, 29 of the third trace 27 correspond to the two terms, respectively, on the right-hand side of Equation (24). The scaled geophone noise 29 now appears as attenuated by a cosine filter, just as in the second term of the right-hand side of Equation (24).

Figure 3:
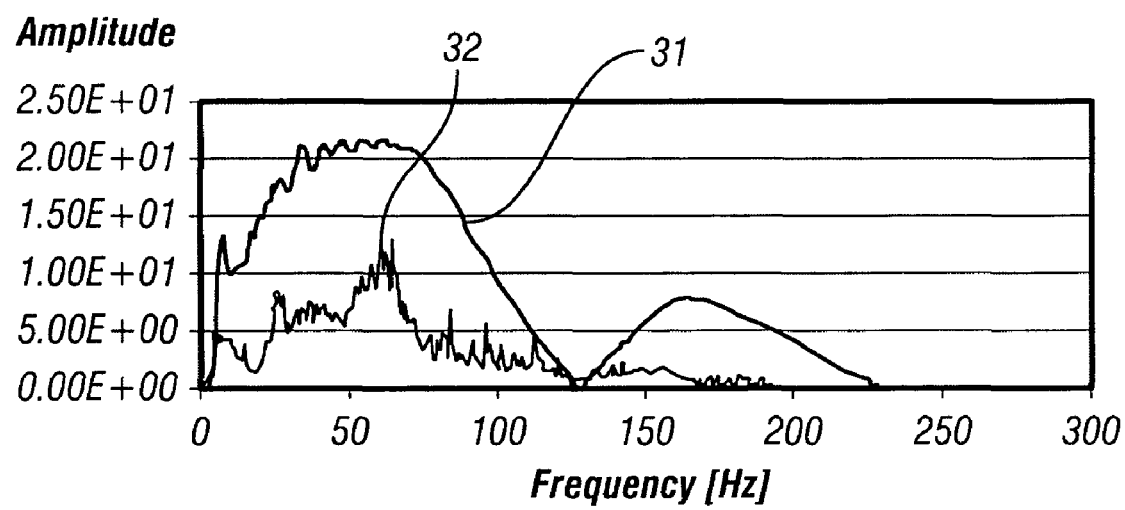
FIG. 3 is the amplitude spectra of the signal and the noise resulting from applying the method of the invention.

FIG. 3 shows the amplitude spectra of the result of applying the method of the invention. Both the resulting signal 31 and the resulting noise 32 are shown after subtraction of the down-going from the up-going pressure wavefield components just below the water surface. The signal 31 of $P_u$ minus $P_d$ extrapolated to just below the sea surface shows the characteristics of a receiver deghosted signal. The noise 32, especially the high peak of geophone noise around 30 Hz (shown at 13 in FIG. 1), is significantly reduced. The reduction in the noise 32 relative to the input geophone noise (shown as 11 in FIG. 1), shows a pattern typical of a cosine filter.

Figure 4:
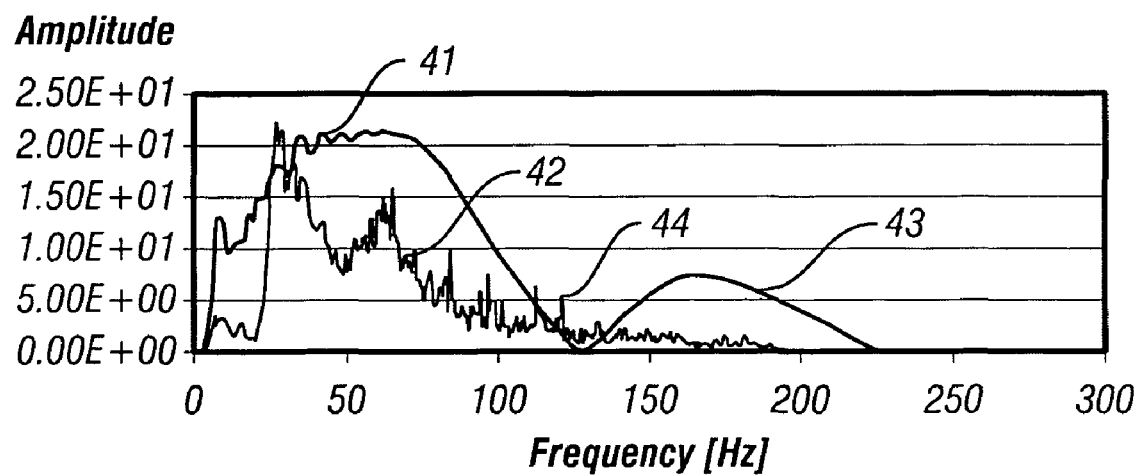
FIG. 4 is the amplitude spectra of the signal and the noise resulting from conventional seismic processing by wavefield separation into up-going and down-going components.

FIG. 4 shows the results of conventional seismic processing by wavefield separation into up-going and down-going wavefield components, for comparison with the results of the method of the invention, as displayed in FIG. 3. The signal 41 and noise 42 of the separated up-going wavefield component and the signal 43 and noise 44 of the separated down-going wavefield component are shown. Note that the amplitude spectra of the signals, 41 and 43, of the up-going and down-going wavefield components, respectively, are alike, and, correspondingly, the amplitude spectra of the noise components, 42 and 44, are also alike. Note further that the signal 31 in FIG. 3 of $P_u$ minus $P_d$ extrapolated to just below the sea surface from the method of the invention is identical to the signal 41 in FIG. 4 of $P_u$ from conventional wavefield separation, as a consequence of Equations (20) and (24).

Figure 5:
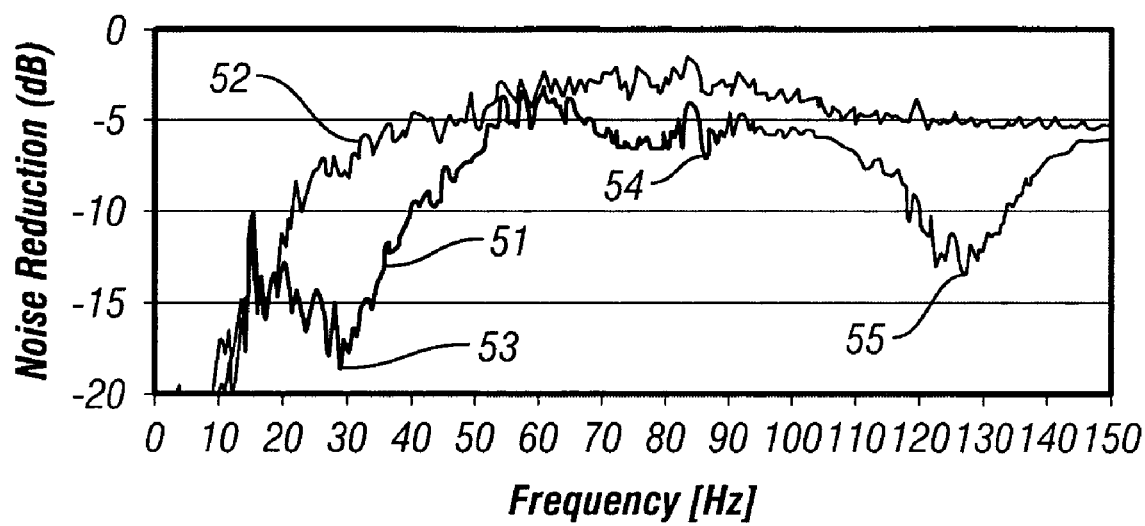
FIG. 5 is a comparison of noise reduction, relative to the input geophone noise, between the method of the invention shown in FIG. 3 and conventional wavefield separation shown in FIG. 4.

FIG. 5 shows a comparison in noise reduction, relative to the input geophone noise (shown as 11 in FIG. 1), between the method of the invention and conventional wavefield separation. Line 51 shows the noise reduction for the method of the invention, while line 52 shows noise reduction for conventional wavefield separation. The filter of the invention acts only on the geophone noise and includes a notch around 25 Hz 53, a notch around 75 Hz 54, and another notch around 125 Hz 55 (for a receiver depth of 15 m). The notch around 25 Hz 53 of this filter is the principal reason for significant improvement in the signal to noise ratio.

Thus, by constructing $P_u$ minus $P_d$ extrapolated to just below the water surface, the method of the invention not only obtains a receiver-ghost free pressure wavefield (i.e. a broader amplitude spectra), but also obtains a signal to noise ratio better than obtained by conventional seismic processing for dual-sensor streamer data, since the scaled geophone noise $\tilde{w}\tilde{N}_G$ is also attenuated.

The embodiment of the method of the invention as illustrated in Equation (24) can be expressed in an alternative form in terms of the recorded sensor signals. Substituting the equivalent expressions in (17) and (19) into Equation (24) yields the following method for calculating the noise-suppressed up-going pressure wavefield component just below the water surface as:

$$\frac{1}{2}\left(\frac{\tilde{H} - \tilde{w}\tilde{G}}{2}\right)\exp[-ik_z(z_r - z)]\bigg|_{z \to 0}^{+} - \quad (25)$$

$$\frac{1}{2}\left(\frac{\tilde{H} + \tilde{w}\tilde{G}}{2}\right)\exp[ik_z(z_r - z)]\bigg|_{z \to 0}^{+} = \tilde{p}_u - \frac{1}{2}\tilde{w}\tilde{N}_G \cos(k_z z_r).$$

Equation (25) shows how to subtract the down-going pressure wavefield component from the up-going pressure wavefield component in the frequency-wavenumber domain, extrapolated to just below the water surface as in the method of the invention, in terms of the recorded hydrophone and geophone signals, $\tilde{H}$ and $\tilde{G}$, respectively, and the amplitude scaling function $\tilde{w}$, along with extrapolation operators based on the vertical wavenumber $k_z$ and the streamer depth $z_r$.

Similarly, a method for calculating the noise-suppressed down-going pressure wavefield component just below the water surface can be expressed as:

$$\frac{1}{2}\left(\frac{\tilde{H}+\tilde{w}\tilde{G}}{2}\right)\exp[ik_z(z_r-z)]\bigg|_{z\to 0^+} - \qquad (26)$$

$$\frac{1}{2}\left(\frac{\tilde{H}-\tilde{w}\tilde{G}}{2}\right)\exp[-ik_z(z_r-z)]\bigg|_{z\to 0^+} = \tilde{p}_d + \frac{1}{2}\tilde{w}\tilde{N}_G\cos(k_z z_r).$$

Due to the amplitude scaling function $\tilde{w}$, all the terms in Equations (25) and (26) act as pressure wavefields.

Equations (25) and (26) can be further generalized to allow variations in factors such as the reflection coefficient at the water surface, as illustrated in another embodiment of the method of the invention. The second term on the left side of Equation (25), representing the down-going pressure wavefield component extrapolated to just below the water surface, can be filtered before subtraction from the first term on the left side of Equation (25), representing the up-going pressure wavefield component extrapolated to just below the water surface. This filtering is designed to better match the up-going and down-going pressure wavefield signal components before subtraction. Thus, Equation (25) becomes the following more general equation in the frequency-wavenumber domain:

$$\frac{1}{2}\left(\frac{\tilde{H}-\tilde{w}\tilde{G}}{2}\right)\exp[-ik_z(z_r-z)]\bigg|_{z\to 0^+} - \qquad (27)$$

$$\tilde{F}_1\frac{1}{2}\left(\frac{\tilde{H}+\tilde{w}\tilde{G}}{2}\right)\exp[ik_z(z_r-z)]\bigg|_{z\to 0^+} = \tilde{p}_u - \frac{1}{2}\tilde{w}\tilde{N}_G\cos(k_z z_r).$$

where $\tilde{F}_1$ is a first matching filter, such as an adaptive Wiener matching filter.

Similarly, the second term on the left side of Equation (26), representing the up-going pressure wavefield component extrapolated to just below the water surface, can be filtered before subtraction to better match the first term on the left side of Equation (26), the down-going pressure wavefield component extrapolated to just below the water surface. Thus, Equation (26) becomes the following more general equation calculated in the frequency-wavenumber domain:

$$\frac{1}{2}\left(\frac{\tilde{H}+\tilde{w}\tilde{G}}{2}\right)\exp[ik_z(z_r-z)]\bigg|_{z\to 0^+} - \qquad (28)$$

$$\tilde{F}_2\frac{1}{2}\left(\frac{\tilde{H}-\tilde{w}\tilde{G}}{2}\right)\exp[-ik_z(z_r-z)]\bigg|_{z\to 0^+} = \tilde{p}_d + \frac{1}{2}\tilde{w}\tilde{N}_G\cos(k_z z_r).$$

where $\tilde{F}_2$ is a second matching filter, such as another adaptive Wiener matching filter.

The matching filters $\tilde{F}_1$ and $\tilde{F}_2$ compensate for inconsistencies between the separated wavefield components. These inconsistencies may be caused by factors including, but not limited to, water surface topography (roughness), water surface reflection coefficient, variations in the velocity of sound in the water, variations in the water density, and deviations in the sensor positions. For a flat water surface with reflection coefficient substantially equal to $-1$, constant water velocity and density, and a flat acquisition surface with a regular sensor distribution, the up-going and down-going pressure wavefield components are substantially equal except for a change in sign and the noise is substantially uncorrelated between the components. Then, the matching filters $\tilde{F}_1$ and $\tilde{F}_2$ tend to ward a value of 1, representing a band limited spike.

Equations (27) and (28) can be further generalized to illustrate yet another embodiment of the method of the invention. The noise-suppressed up-going pressure wavefield component at an arbitrary virtual observation surface at $z=z_{obs}$ can be obtained by multiplying both sides of Equation (27) by the backward extrapolation operator $\exp[ik_z z_{obs}]$ from $z=0$ to $z=z_{obs}$, yielding:

$$\frac{1}{2}\left(\frac{\tilde{H}-\tilde{w}\tilde{G}}{2}\right)\exp[-ik_z(z_r-z_{obs})] - \qquad (29)$$

$$\tilde{F}_1\frac{1}{2}\left(\frac{\tilde{H}+\tilde{w}\tilde{G}}{2}\right)\exp[ik_z(z_r+z_{obs})] \cong \left[\tilde{p}_u - \frac{1}{2}\tilde{w}\tilde{N}_G\cos(k_z z_r)\right]\exp[ik_z z_{obs}].$$

A filter design window that is sufficiently large will give an substantially optimal match between the two pressure wavefield signal components on the left side of Equation (29), without effecting the substantially uncorrelated noise. Thus, this embodiment of the method of the invention, as expressed in Equation (29), yields the up-going pressure wavefield component at the virtual observation surface at $z=z_{obs}$ with the scaled geophone noise attenuated by the same cosine filter as previously described.

Similarly, the noise-suppressed down-going pressure wavefield component at the virtual observation surface at $z=z_{obs}$ can be obtained by multiplying both sides of Equation (28) by the forward extrapolation operator $\exp[-ik_z z_{obs}]$ from $z=0$ to $z=z_{obs}$, yielding:

$$\frac{1}{2}\left(\frac{\tilde{H}+\tilde{w}\tilde{G}}{2}\right)\exp[ik_z(z_r-z_{obs})] - \qquad (30)$$

$$\tilde{F}_2\frac{1}{2}\left(\frac{\tilde{H}-\tilde{w}\tilde{G}}{2}\right)\exp[-ik_z(z_r+z_{obs})] \cong \left[\tilde{p}_d + \frac{1}{2}\tilde{w}\tilde{N}_G\cos(k_z z_r)\right]\exp[-ik_z z_{obs}].$$

In an alternative embodiment, the matching filters $\tilde{F}_1$ and $\tilde{F}_2$ may be designed to compensate for differences in amplitude only. In this case, the sea surface reflection coefficients may be calculated from the matching filters. In another alternative embodiment, the matching filters $\tilde{F}_1$ and $\tilde{F}_2$ may be designed to compensate for differences in phase only. In this case, the sea surface topography may be calculated from the matching filters. In yet another embodiment, the matching filters $\tilde{F}_1$ and $\tilde{F}_2$ may simply be set equal to one or zero. The case in which $\tilde{F}_1$ and $\tilde{F}_2$ are set equal to one reduces the general cases represented in Equations (27) and (28) to the embodiments given in Equations (25) and (26), respectively.

The case in which $\tilde{F}_1$ and $\tilde{F}_2$ are set equal to zero reduces the general cases represented in Equations (29) and (30) to the conventional wavefield separation given in Equations (14) and (15).

Figure 6:
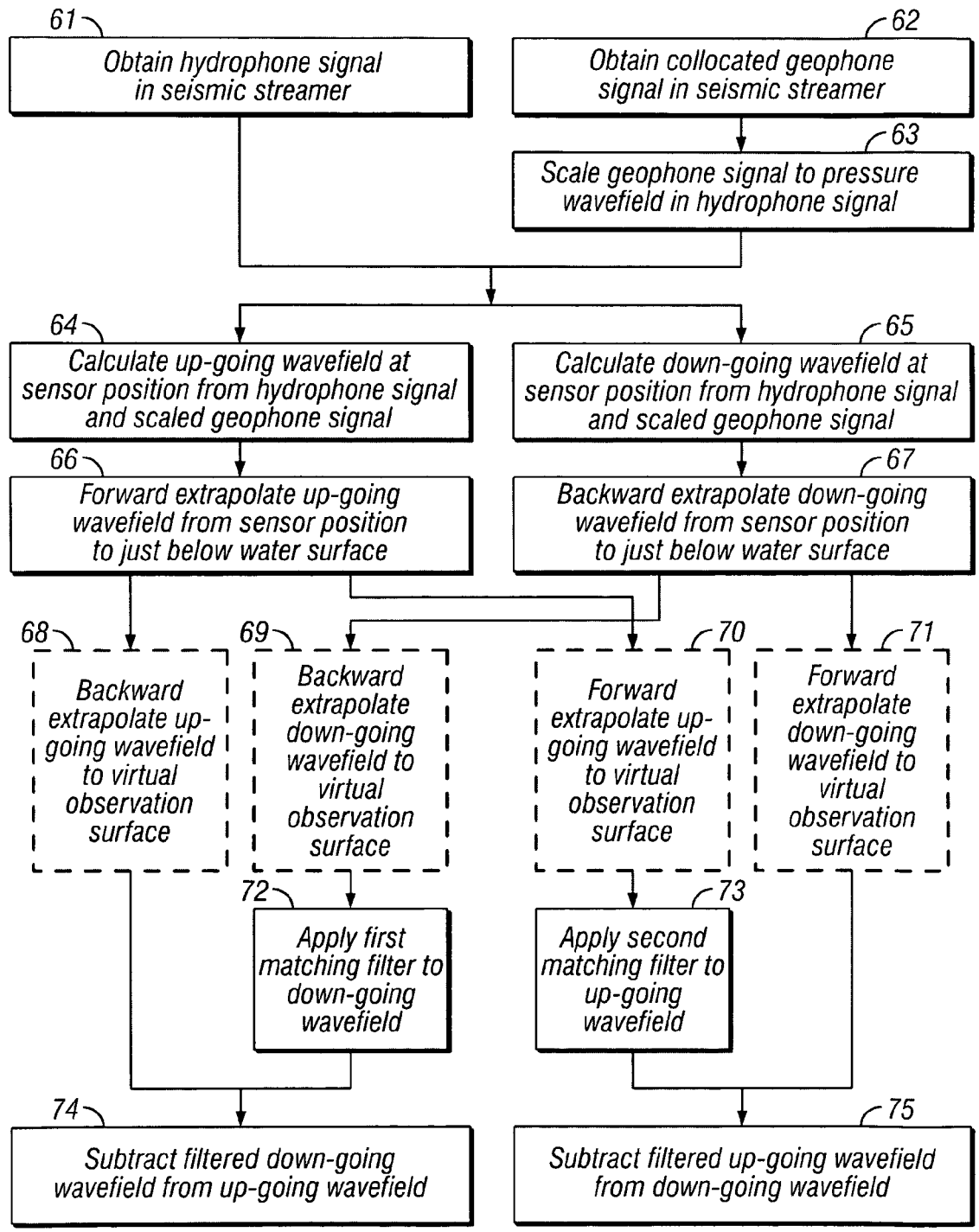
FIG. 6 is a flowchart illustrating the processing steps of an embodiment of the method of the invention for attenuating noise in marine seismic streamers.

FIG. 6 is a flowchart illustrating the processing steps of an embodiment of the method of the invention for attenuation of noise from seismic data recorded by pressure sensors and particle motion sensors in marine towed streamers. In particular, the noise being attenuated comprises the receiver-side ghost noise as well as the particle motion sensor mechanical noise. For illustrative simplicity, and not as a limitation on the invention, the pressure sensors and particle motion sensors will be referred to by their conventional embodiments of hydrophones and geophones, respectively. The seismic data is preferably in the form of common shot gathers or common sensor gathers.

At step 61, a measurement of a pressure wavefield is obtained from a pressure sensor, such as a hydrophone, in a towed marine seismic streamer. For illustrative purposes only, the pressure measurement will be referred to as a hydrophone signal.

At step 62, a measurement of a vertical velocity wavefield is obtained from a vertical velocity sensor, such as a vertical geophone, at a location adjacent the hydrophone from step 61 in the towed marine seismic streamer. For illustrative purposes only, the vertical velocity measurement will be referred to as a geophone signal.

At step 63, the geophone signal from step 62 is scaled to correct for relative differences in the amplitudes of pressure and vertical velocity wavefield measurements. An angle-dependent amplitude scaling function is selected to transform the unidirectional vertical velocity wavefield of the geophone signal into an omni-directional pressure wavefield as in the hydrophone signal from step 61. The amplitude scaling function is described above in the discussion with regard to Equations (2) to (6).

At step 64, an up-going pressure wavefield component at the streamer sensor position, accompanied by scaled geophone noise, is calculated from a difference of the hydrophone signal from step 61 and the scaled geophone signal from step 63. The calculation of the up-going wavefield component is preferably as given in Equation (14), above.

At step 65, a down-going pressure wavefield component at the sensor position, accompanied by the scaled geophone noise, is calculated from a sum of the hydrophone signal from step 61 and the scaled geophone signal from step 63. The calculation of the down-going wavefield component is preferably as given in Equation (15), above.

At step 66, the up-going pressure wavefield component at the streamer sensor position from step 64 is extrapolated forward in time from the sensor position up in space to a position just below the water surface. The extrapolation of the up-going pressure wavefield component, accompanied by scaled geophone noise, is preferably as given in Equation (17), above.

At step 67, the down-going pressure wavefield component at the sensor position from step 65 is extrapolated backward in time from the sensor position up in space to a position just below the water surface. The extrapolation of the down-going pressure wavefield component, accompanied by the scaled geophone noise, is preferably as given in Equation (19), above.

In an optional alternate embodiment, illustrated at optional steps 68 and 69, the up-going and downgoing pressure wavefield components, extrapolated to a position just below the water surface in steps 66 and 67, respectively, may be further extrapolated to an arbitrary virtual observation surface before proceeding for further processing in steps 72 and 74. Similarly, at optional steps 70 and 71, the up-going and downgoing pressure wavefield components, extrapolated to a position just below the water surface in steps 66 and 67, respectively, may be further extrapolated to an arbitrary virtual observation surface before proceeding for further processing in steps 73 and 75.

At optional step 68, the up-going pressure wavefield component, forward extrapolated to a position just below the water surface in step 66, may be further backward extrapolated to an arbitrary virtual observation surface before proceeding to step 74 for further processing. Otherwise, optional steps 68 and 69 are skipped and the process proceeds directly to step 72.

At optional step 69, the down-going pressure wavefield component, backward extrapolated to a position just below the water surface in step 67, may be further backward extrapolated to an arbitrary virtual observation surface before applying a matching filter in step 72, below. Otherwise, optional steps 68 and 69 are skipped and the process proceeds directly to step 72.

At optional step 70, the up-going pressure wavefield component, forward extrapolated to a position just below the water surface in step 66, may be further forward extrapolated to an arbitrary virtual observation surface before applying a matching filter in step 73, below. Otherwise, optional steps 70 and 71 are skipped and the process proceeds directly to step 73.

At optional step 71, the down-going pressure wavefield component, backward extrapolated to a position just below the water surface in step 67, may be further forward extrapolated to an arbitrary virtual observation surface before applying a matching filter in step 73. Otherwise, optional steps 70 and 71 are skipped and the process proceeds directly to step 73.

At step 72, a first matching filter is applied to the extrapolated down-going pressure wavefield component at the position just below the water surface from step 67 to compensate for inconsistencies between the separated wavefield components. This first matching filter is described above in the discussion with regard to Equations (27) and (28), above. In the optional alternate embodiment described above in steps 68 and 69, the first matching filter is applied to the extrapolated down-going pressure wavefield component at the virtual observation surface from step 69.

At step 73, a second matching filter is applied to the extrapolated up-going pressure wavefield component at the position just below the water surface from step 66 to compensate for inconsistencies between the separated wavefield components. This second matching filter is also described above in the discussion with regard to Equations (27) and (28), above. In the optional alternate embodiment described above in steps 70 and 71, the second matching filter is applied to the extrapolated down-going pressure wavefield component at the virtual observation surface from step 70.

At step 74, the filtered and extrapolated down-going pressure wavefield component from step 67 is subtracted from the extrapolated up-going pressure wavefield component from step 66 at the position just below the water surface. The subtraction of the extrapolated wavefield components is preferably as given in Equation (27), above. This subtraction yields the up-going pressure wavefield component at the position just below the water surface with its scaled geophone noise attenuated by a cosine filter, as shown in Equation (27), above.

In the optional alternate embodiment described above in steps 68, 69, and 72, the filtered and extrapolated down-going pressure wavefield component from step 72 is subtracted from the extrapolated up-going pressure wavefield component from step 68 at the virtual observation surface. The subtraction of the extrapolated wavefield components is preferably as given in Equation (29), above. This subtraction yields the up-going pressure wavefield component at the virtual observation surface with its scaled geophone noise attenuated by the same cosine filter as before, as shown in Equation (29), above.

At step 75, the filtered and extrapolated up-going pressure wavefield component from step 66 is subtracted from the extrapolated up-going pressure wavefield component from step 67 at the position just below the water surface. The subtraction of the extrapolated wavefield components is preferably as given in Equation (28), above. This subtraction yields the down-going pressure wavefield component at the position just below the water surface with its scaled geophone noise attenuated by a cosine filter, as shown in Equation (28), above.

In the optional alternate embodiment described above in steps 70, 71, and 73, the filtered and extrapolated up-going pressure wavefield component from step 73 is subtracted from the extrapolated down-going pressure wavefield component from step 71 at the virtual observation surface. The subtraction of the extrapolated wavefield components is preferably as given in Equation (30), above. This subtraction yields the down-going pressure wavefield component at the virtual observation surface with its scaled geophone noise attenuated by the same cosine filter as before, as shown in Equation (30), above.

The result of application of the method of the invention, as just described in reference to the flowchart in FIG. 6, is attenuation of the mechanical streamer noise in the vertical velocity data, as recorded by geophones, in both the up-going and down-going pressure wavefield components, along with attenuation of the receiver-side ghosts in the production of the noise-suppressed up-going pressure wavefield component.

It should be understood that the preceding is merely a detailed description of specific embodiments of this invention and that numerous changes, modifications, and alternatives to the disclosed embodiments can be made in accordance with the disclosure here without departing from the scope of the invention. The preceding description, therefore, is not meant to limit the scope of the invention. Rather, the scope of the invention is to be determined only by the appended claims and their equivalents.

We claim:

1. A method for processing seismic data from a towed marine seismic streamer having particle motion sensors and pressure sensors, comprising:

scaling signals detected by the particle motion sensors to match signals detected by the pressure sensors;

combining the pressure sensor signals and the scaled particle motion sensor signals to generate up-going and down-going pressure wavefield components;

extrapolating the up-going and down-going pressure wavefield components to a position just below a water surface;

applying a first matching filter to the extrapolated down-going pressure wavefield component; and subtracting the matching filtered extrapolated down-going pressure wavefield component from the extrapolated up-going pressure wavefield component, generating an up-going pressure wavefield component with particle motion sensor noise attenuated with a cosine filter.

2. The method of claim 1, further comprising:

applying a second matching filter to the extrapolated up-going pressure wavefield component to math the extrapolated up-going and down-going pressure wavefield components; and subtracting the matching filtered extrapolated up-going pressure wavefield component from the extrapolated down-going pressure wavefield component, generating a down-going pressure wavefield component with particle motion sensor noise attenuated with a cosine filter.

3. The method of claim 1, wherein the scaling a particle motion sensor signal comprises applying an amplitude scaling function to the particle motion sensor signal to correct for amplitude differences between the pressure sensor signal and particle motion sensor signal.

4. The method of claim 2, wherein the pressure sensor signal is a hydrophone signal and the particle motion sensor signal is a geophone signal.

5. The method of claim 4, wherein the extrapolating the up-going and down-going pressure wavefield components further comprises:

backward extrapolating the extrapolated up-going and down-going pressure wavefield components to a virtual observation surface.

6. The method of claim 5, wherein the extrapolating the up-going and down-going pressure wavefield components further comprises:

forward extrapolating the extrapolated up-going and down-going pressure wavefield components to a virtual observation surface.

7. The method of claim 4, wherein the subtracting the filtered down-going pressure wavefield component from the extrapolated up-going pressure wavefield component is obtained by calculating the following expression in the frequency-wavenumber domain:

$$\frac{1}{2}\left(\frac{\tilde{H}-\tilde{w}\tilde{G}}{2}\right)\exp[-ik_z(z_r-z)]\bigg|_{z\to 0}^{+} - \tilde{F}_1 \frac{1}{2}\left(\frac{\tilde{H}+\tilde{w}\tilde{G}}{2}\right)\exp[ik_z(z_r-z)]\bigg|_{z\to 0}^{+},$$

where $\tilde{H}$ is the hydrophone signal, $\tilde{G}$ is the geophone signal, $\tilde{w}$ is the amplitude scaling function, $k_z$ is a vertical wavenumber, $z_r$ is depth of the streamer below the water surface, $z$ is vertical direction measured downward from the water surface, and $\tilde{F}_1$ is the first matching filter.

8. The method of claim 7, wherein the subtracting the filtered up-going pressure wavefield component from the extrapolated down-going pressure wavefield component is obtained by calculating the following expression in the frequency-wavenumber domain:

$$\frac{1}{2}\left(\frac{\tilde{H}+\tilde{w}\tilde{G}}{2}\right)\exp[ik_z(z_r-z)]\bigg|_{z\to 0}^{+} - \tilde{F}_2 \frac{1}{2}\left(\frac{\tilde{H}-\tilde{w}\tilde{G}}{2}\right)\exp[-ik_z(z_r-z)]\bigg|_{z\to 0}^{+},$$

where $\tilde{F}_2$ is the second matching filter.

9. The method of claim 8, wherein the matching filters $\tilde{F}_1$ and $\tilde{F}_2$ compensate for inconsistencies between the up-going and down-going pressure wavefield components.

10. The method of claim 9, wherein the matching filters $\tilde{F}_1$ and $\tilde{F}_2$ compensate for amplitude inconsistencies between the up-going and down-going pressure wavefield components.

11. The method of claim 9, wherein the matching filters $\tilde{F}_1$ and $\tilde{F}_2$ compensate for phase inconsistencies between the up-going and down-going pressure wavefield components.

12. The method of claim 8, wherein the matching filters $\tilde{F}_1$ and $\tilde{F}_2$ are adaptive Wiener filters.

13. The method of claim 8, wherein the matching filters $\tilde{F}_1$ and $\tilde{F}_2$ equal zero.

14. The method of claim 8, wherein the matching filters $\tilde{F}_1$ and $\tilde{F}_2$ equal one.

15. The method of claim 5 wherein the subtracting the filtered down-going component from the extrapolated up-going component attenuates the particle motion sensor noise in the up-going pressure wavefield component with a cosine filter.

16. The method of claim 6, wherein the subtracting the filtered up-going pressure wavefield component from the extrapolated down-going pressure wavefield component attenuates the particle motion sensor noise in the down-going pressure wavefield component with a cosine filter.

17. The method of claim 5, wherein the subtracting the filtered down-going pressure wavefield component from the extrapolated up-going pressure wavefield component is obtained by calculating the following expression in the frequency-wavenumber domain:

$$\frac{1}{2}\left(\frac{\tilde{H}-\tilde{w}\tilde{G}}{2}\right)\exp[-ik_z(z_r-z_{obs})]-\tilde{F}_1\frac{1}{2}\left(\frac{\tilde{H}+\tilde{w}\tilde{G}}{2}\right)\exp[ik_z(z_r+z_{obs})],$$

where $\tilde{H}$ is the hydrophone signal, $\tilde{G}$ is the geophone signal, $\tilde{w}$ is the amplitude scaling function, $k_z$ is a vertical wavenumber, $z_r$ is depth of the streamer below the water surface, $z_{obs}$ is depth of the virtual observation surface below the water surface, and $\tilde{F}_1$ is the first matching filter.

18. The method of claim 6, wherein the subtracting the filtered up-going pressure wavefield component from the extrapolated down-going pressure wavefield component is obtained by calculating the following expression in the frequency-wavenumber domain:

$$\frac{1}{2}\left(\frac{\tilde{H}+\tilde{w}\tilde{G}}{2}\right)\exp[ik_z(z_r-z_{obs})]-\tilde{F}_2\frac{1}{2}\left(\frac{\tilde{H}-\tilde{w}\tilde{G}}{2}\right)\exp[-ik_z(z_r+z_{obs})],$$

where $\tilde{H}$ is the hydrophone signal, $\tilde{G}$ is the geophone signal, $\tilde{w}$ is the amplitude scaling function, $k_z$ is a vertical wavenumber, $z_r$ is depth of the streamer below the water surface, $z_{obs}$ is depth of the virtual observation surface below the water surface, and $\tilde{F}_2$ is the first matching filter.

* * * * *